(12) United States Patent
Houser et al.

(10) Patent No.: US 11,143,778 B2
(45) Date of Patent: Oct. 12, 2021

(54) CABLE END SENSING APPARATUS AND METHOD

(71) Applicant: TE Connectivity Services GmbH, Schaffhausen (CH)

(72) Inventors: Matthew Steven Houser, Hummelstown, PA (US); Gary L. Deck, Bethel, PA (US); Michael Morris, Harrisburg, PA (US)

(73) Assignee: TE Connectivity Services GmbH

( * ) Notice: Subject to any disclaimer, the term of this patent is extended or adjusted under 35 U.S.C. 154(b) by 85 days.

(21) Appl. No.: 16/657,539

(22) Filed: Oct. 18, 2019

(65) Prior Publication Data
US 2021/0116594 A1    Apr. 22, 2021

(51) Int. Cl.
*G01V 3/08*    (2006.01)
*H01B 13/00*    (2006.01)

(52) U.S. Cl.
CPC ......... *G01V 3/088* (2013.01); *H01B 13/0036* (2013.01)

(58) Field of Classification Search
None
See application file for complete search history.

(56) References Cited

U.S. PATENT DOCUMENTS

| 4,850,221 A | 7/1989 | Zielke |
| 7,721,421 B2 | 5/2010 | Matsuoka |
| 2015/0128414 A1* | 5/2015 | Haslinger ............ H02G 1/1295 29/867 |

FOREIGN PATENT DOCUMENTS

JP    2001357960 A    12/2001

OTHER PUBLICATIONS

You Chung Chung et al, Capacitance and Inductance Sensor Circuits for Detecting the Lengths of Open-and-Short Circuited Wires, IEEE Transactions on Instrumentation and Measurement, Aug. 2009, pp. 2495-2502 vol. 58, No. 8.
International Search Report, International Application No. PCT/IB2020/059792 dated Oct. 18, 2020.

* cited by examiner

*Primary Examiner* — Jas A Sanghera

(57) ABSTRACT

A cable end sensing apparatus and a method of sensing a cable end of a cable in a cable preparation device. The cable end sensing apparatus includes cable clamps for clamping and moving the cable and a movable sensing device. The movable sensing device has a first position in which the movable sensing device is positioned in line with an axis of insertion of the cable to engage the end of the cable and to prevent the cable from moving beyond the movable sensing device. The movable sensing device has a second position in which the movable sensing device is moved away from the axis of insertion of the cable when the cable end is properly positioned to allow the cable to move beyond the sensing device.

20 Claims, 6 Drawing Sheets

CABLE END SENSING APPARATUS AND METHOD

FIELD OF THE INVENTION

The present invention is directed to.

BACKGROUND OF THE INVENTION

Devices that facilitate positioning cables in a cable preparation device are known. Various existing machines use only a hard stop to locate the cable end. This method relies on the operator placing the cable correctly in the machine every time, which introduces the risk of user error. Also, this method does not ensure the cable did not move during the preparation process.

Other existing machines locate the cable end by means of a thru-beam sensor. This method requires extra processing time for the machine to find the end of the cable. In addition, this method typically does not check for proper placement at the end of the preparation process.

Still other existing machines locate the cable end by means of a mechanical switch. When the cable is pressed against the device, it closes a circuit that signals to the machine to begin the preparation cycle. These machines are prone to mechanical failure and, again, do not check for proper cable placement at the end of the cycle.

It would, therefore, be beneficial to provide a cable end sensing apparatus that accurately positions the end of the cable before beginning the cable preparation cycle and checks for proper cable position after completion of the cycle, thereby ensuring proper strip or cut lengths on the cable.

SUMMARY OF THE INVENTION

An object is to provide a sensing method which uses a sensing device to check the cable position before beginning the cycle, and later uses the same sensing device to check the cable position after completing the cycle, thereby ensuring proper strip or cut lengths on the cable.

An embodiment is directed to a method of sensing a cable end of a cable in a cable preparation device. The method includes: positioning the cable end of the cable in engagement with a sensing device; detecting the cable end with the sensing device; clamping cable with cable clamps; detecting with the sensing device if the cable end remains in engagement with the sensing device after the cable is clamped; moving the cable end toward the sensing device if the cable end is not detected by the sensing device; and moving the sensing device away from an axis of insertion of the cable to allow the cable to enter the cable preparation device.

An embodiment is directed to a cable end sensing apparatus for detecting an end of a cable. The cable end sensing apparatus includes cable clamps for clamping and moving the cable and a movable sensing device. The movable sensing device has a first position in which the movable sensing device is positioned in line with an axis of insertion of the cable to engage the end of the cable and to prevent the cable from moving beyond the movable sensing device. The movable sensing device has a second position in which the movable sensing device is moved away from the axis of insertion of the cable to allow the cable to move beyond the sensing device.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
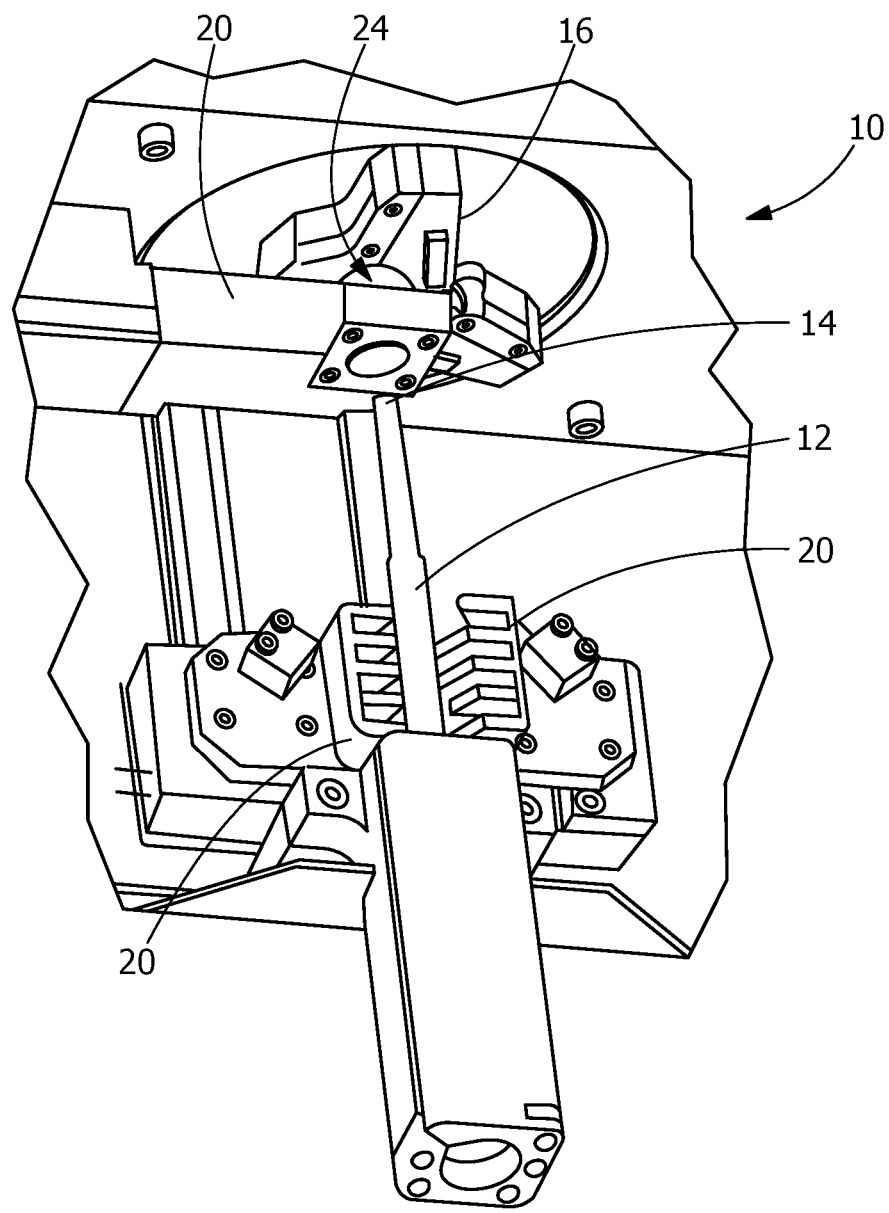
FIG. 1 is a perspective view of an illustrative cable end sensing apparatus according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, a cable end sensing apparatus 10 is provided to detect or sense an end 14 of a cable 12 to ensure proper positioning of the cable 12 in a cable preparation device 16. A factor in the preparation of the cable 12 is the strip or cut lengths of different parts (i.e. outer jacket, braid and inner jacket) of the cable 12. The strip or cut lengths of the different parts require a level of precision so that further cable processing steps, such as, but not limited to, termination, can be performed to specification. The cable end sensing apparatus 10 allows for the precise positioning of the cable 12 prior to the cable 12 being inserted into the cable preparation device 12. In addition, the use of the cable end sensing apparatus 10 allows for quicker machine loading of the cable 12 because it requires less precision on the part of the operator.

As shown in the FIGS. 2 through 10, the cable end sensing apparatus has a pair of cable clamps 20, an inner guard 22 and a sensing device 24. In the illustrative embodiment shown, the cable clamps 20 are driven by a pneumatic device (not shown). However, the cable clamps 20 may be driven by spring force or other types of closing forces. The inner guard 22 is a safety device which prevents the operator from making contact with the cable preparation device 16. The inner guard 22 is optional and may have many different configurations without departing from the scope of the invention.

In the illustrative embodiment, the sensing device 24 is a sensing plate which detects changes in capacitance of the cable 12 to determine whether or not the cable 12 is contacting the sensing device 24. The sensing device 24 is movable in a direction which is perpendicular to an axis 26 of insertion of the cable 12 to allow the cable 12 to be moved into the cable preparation device 16. However, other configurations and motions of the sensing device 24 may be used. In the illustrative embodiment shown, the sensing device 24 is driven by a pneumatic device (not shown). However, the sensing device 24 may be moved using other drive mechanisms.

Figure 2:
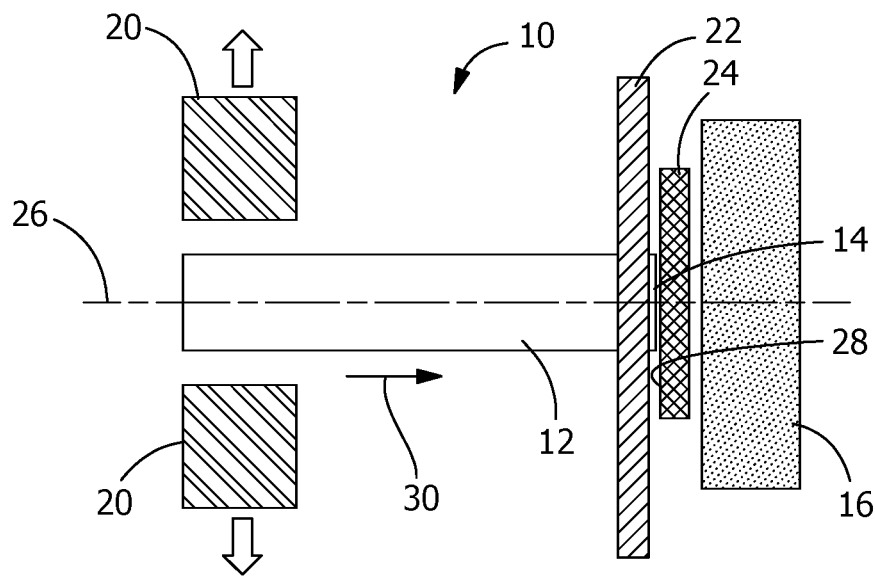
FIG. 2 is a top diagrammatic view of a cable inserted into the cable end sensing apparatus.

In the initial position, as shown in FIG. 2, the cable clamps 20 are in the open position and the sensing device 24 is positioned in a first position in which the sensing device 24 is in line with the axis 26 of insertion of the cable 12 into the cable preparation device 16. When in the open position, the cable 12 is inserted between the cable clamps 20. Insertion continues until the end 14 of the cable 12 engages a surface 28 of the sensing device 24 causing a hard stop of the cable 12 in the direction 30 of insertion. In this position, the sensing device 24 also acts as a guard to prevent the operator or the cable 12 from moving past the sensing device 24 and improperly entering or engaging the cable preparation device 16.

Figure 3:
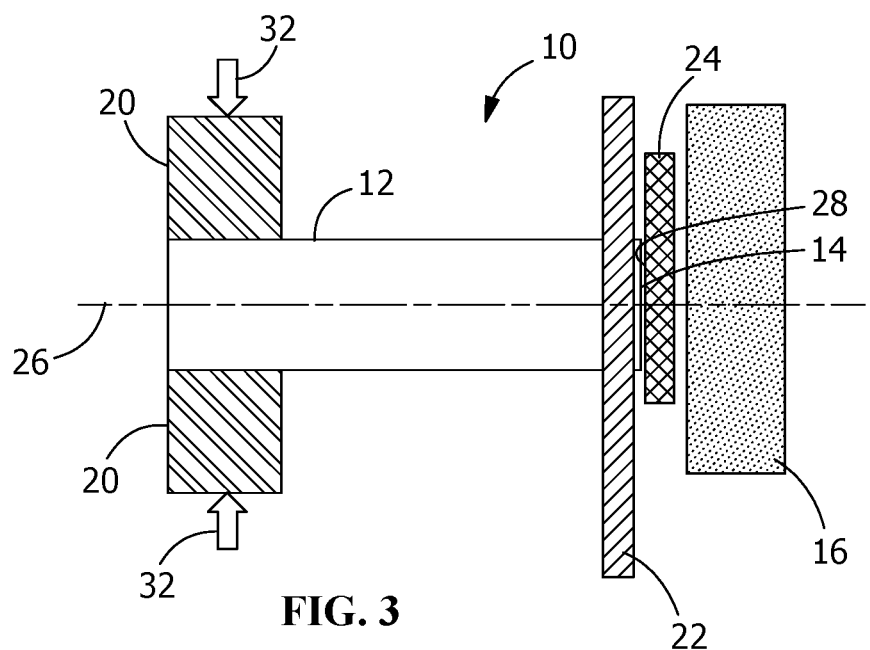
FIG. 3 is a top diagrammatic view of the cable inserted into the cable end sensing apparatus, with the cable clamp gripping the cable.
Figure 4:
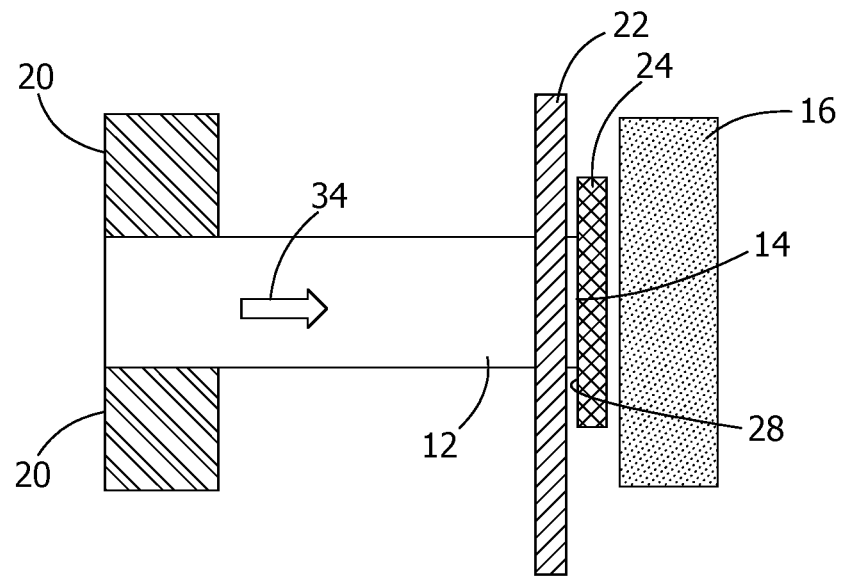
FIG. 4 is a top diagrammatic view of the cable clamp moving the cable toward a sensing plate of the cable end sensing apparatus, whereby the end of the cable is in contact with a sensing plate.

With the cable end 14 positioned in engagement with the surface 28 of the sensing device 24, the sensing device detects the cable end 14 and the cable clamps 20 are moved, as indicated by arrows 32 in FIG. 3, into engagement with the cable 12 to provide a secure grip between the cable clamps 20 and the cable 12.

Figure 5:
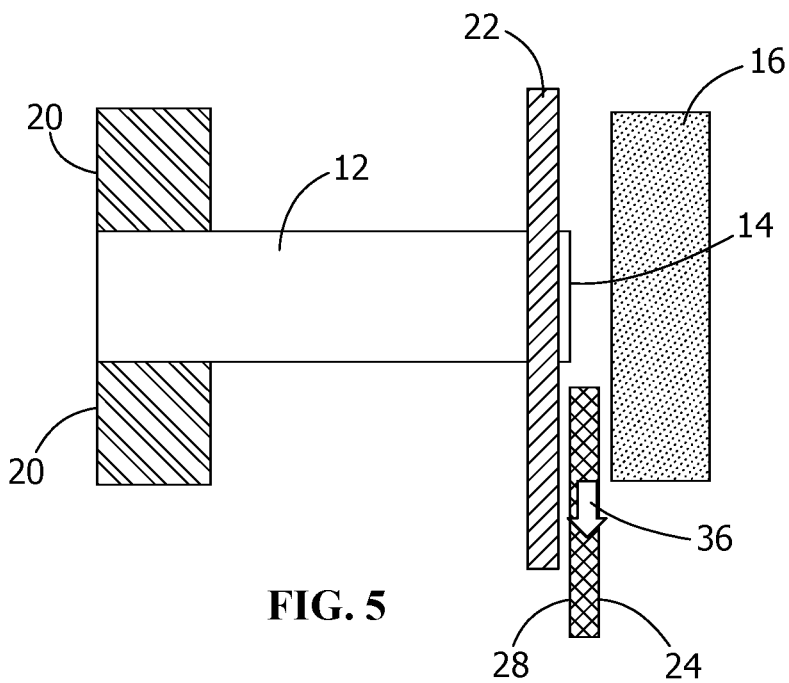
FIG. 5 is a top diagrammatic view showing the sensing plate moved from the path of the cable.

Once the cable 12 is secured by the cable clamps 20, if the sensing device 24 detects that the cable end 14 remains in engagement with the surface 28 of the sensing device 24, the sensing device 24 is moved as shown in FIG. 5, as will be more fully described. If the cable end 14 is not detected by the sensing device 24 after the cable 12 is clamped, the cable clamps 20 and the cable 12 are moved toward the surface 28 of the sensing device 24, as indicated by arrow 34 of FIG. 4. This movement occurs until the sensing device 24 detects the cable end 14 in engagement with the surface 28.

The sensing device 24 acts as a hard stop that detects changes in capacitance of the cable 12 to determine whether or not the cable 12 is contacting the sensing device 24 or hard stop. If the cable 12 is not contacting the sensing device 24, the cable clamps 20 advance the cable 12 until the cable end 14 is detected by the sensing device 24. As the cable end sensing apparatus 10 facilitates the proper positioning of the cable end 14, this allows for less precise cable loading by the operator.

If the sensing device 24 does not detect the cable end 14 with a certain predetermined distance, the sensing device 24 of the cable end sensing apparatus 10 will enter a fault state and alert the operator that there is an issue with the cable 12 location.

If the cable end 14 is detected by the sensing device 24, the sensing device 24 provides a signal that the cable preparation process may proceed. This causes the sensing device 24 to move perpendicular to the axis 26 of insertion of the cable 12. The movement continues, as shown by the arrow 36 in FIG. 5, until the sensing device 24 is moved to a second position in which the sensing device 24 is moved away from the axis 26 to allow the cable end 14 of the cable 12 to move beyond the sensing device 24 and enter the cable preparation device 16.

Figure 6:
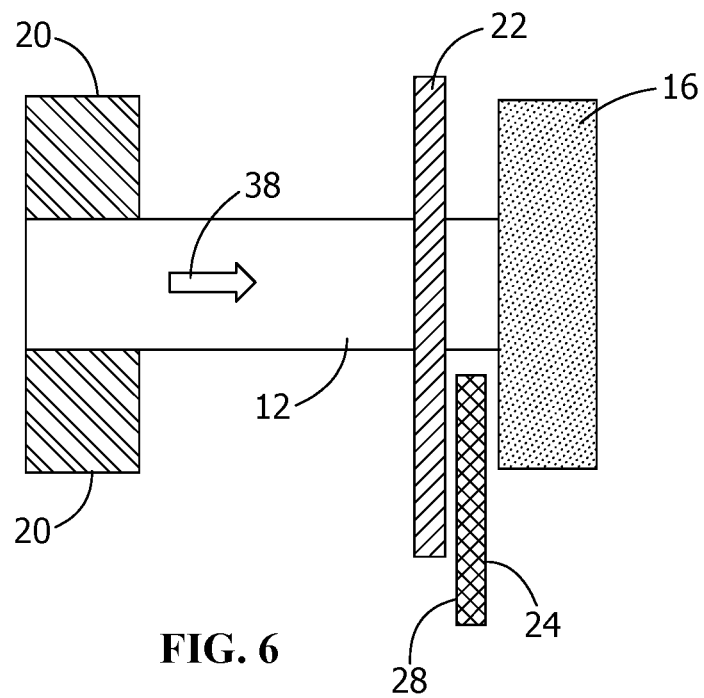
FIG. 6 is a top diagrammatic view of the end of the cable inserted into a cable preparation mechanism.

With the sensing device 24 moved from the axis 26 of insertion, the cable clamps 20 and cable 12 are moved in the direction of arrow 38 in FIG. 6, toward the cable preparation device 16. This movement continues until the cable end 14 of the cable 12 is positioned in the cable preparation device 16. With the cable end 14 positioned in the cable preparation device 16, the cable preparation device 16 prepares the cable end 14 as required.

Figure 7:
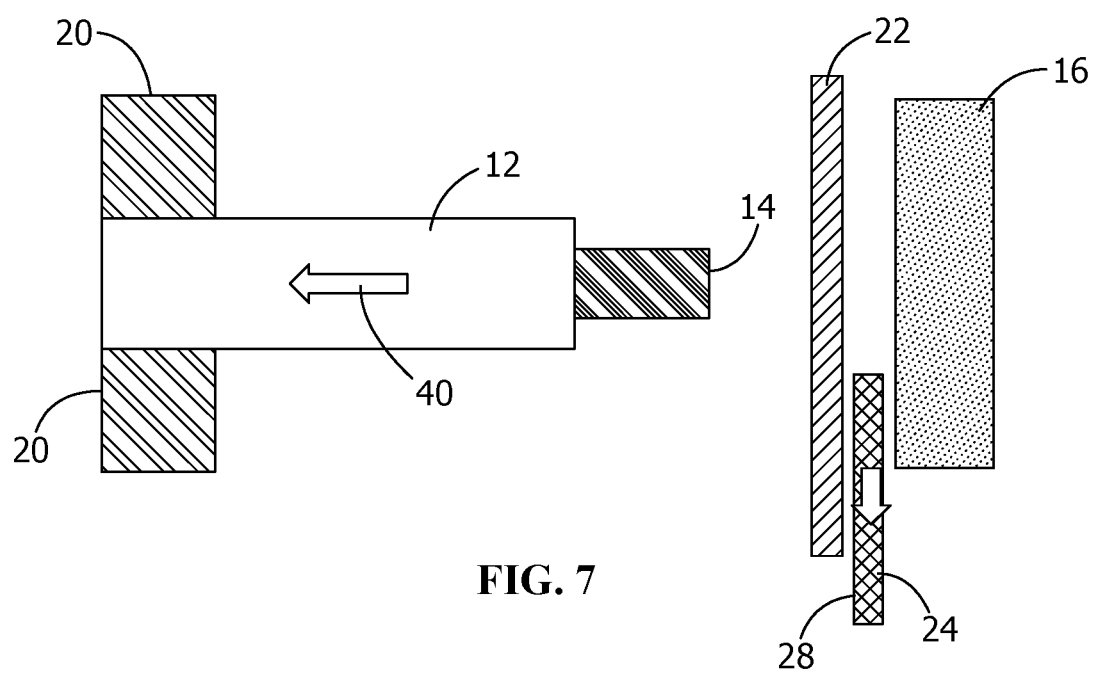
FIG. 7 is a top diagrammatic view of the cable clamp and the cable being retracted from the cable preparation mechanism to expose the stripped end of the cable.
Figure 8:
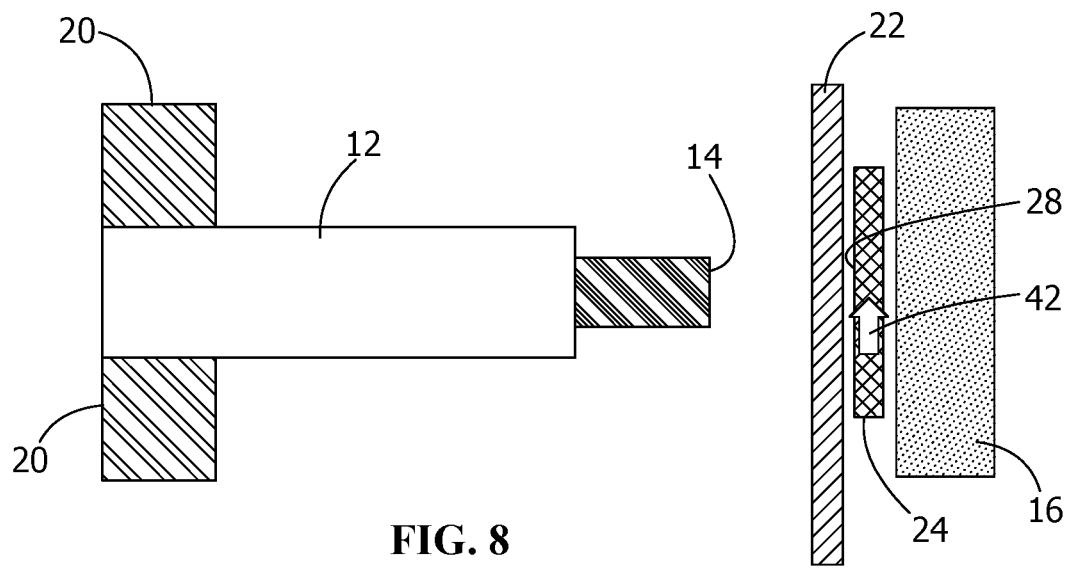
FIG. 8 is a top diagrammatic view showing the sensing plated moved back into the path of the cable.

With the cable end 14 properly prepared by the cable preparation device 16, the cable clamps 20 and cable 12 are retracted and moved in the direction of arrow 40 in FIG. 7. This movement is continued until the cable end 14 is moved past the plane of the sensing device 24. The sensing device 24 is then moved perpendicular to the axis 26 of insertion of the cable 12, as indicated by arrow 42 of FIG. 8, back to its original position. The sensing device 24 is moved to be in line with the axis 26, thereby preventing the cable end 14 of the cable 12 from entering the cable preparation device 16.

Figure 9:
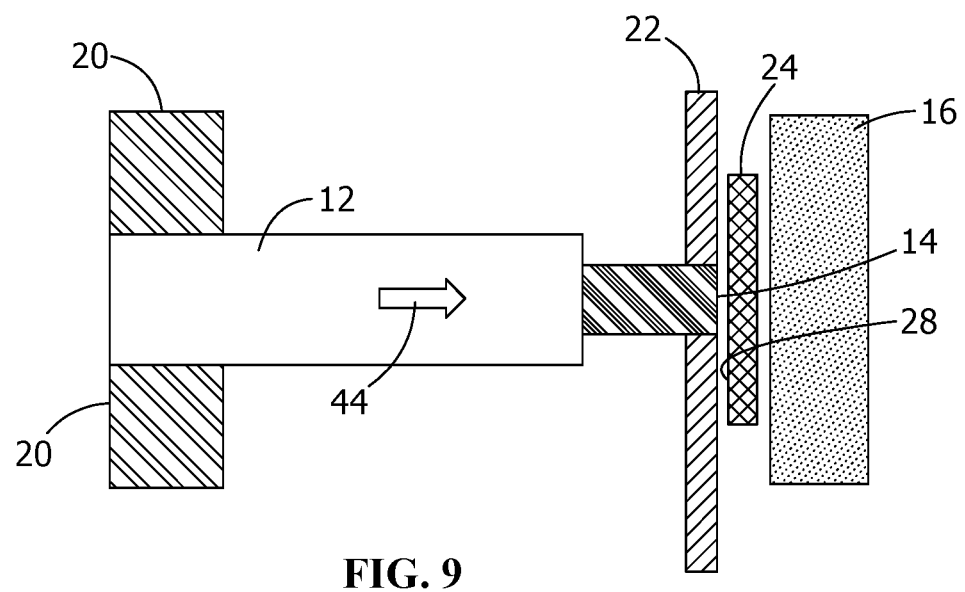
FIG. 9 is a top diagrammatic view of the cable clamp moving the stripped cable end back toward the sensing plate, whereby the stripped end of the cable is in contact with the sensing plate.

With the sensing device 24 properly positioned, the cable clamps 20 and cable 12 are advanced and moved toward the sensing device, as shown by the arrow 44 in FIG. 9. This movement occurs until the sensing device 24 detects the cable end 14 in engagement with the surface 28.

If the sensing device 24 does not detect the cable end 14 with a certain predetermined distance, the sensing device 24 of the cable end sensing apparatus 10 will enter a fault state and alert the operator that there is an issue with the cable preparation process.

Figure 10:
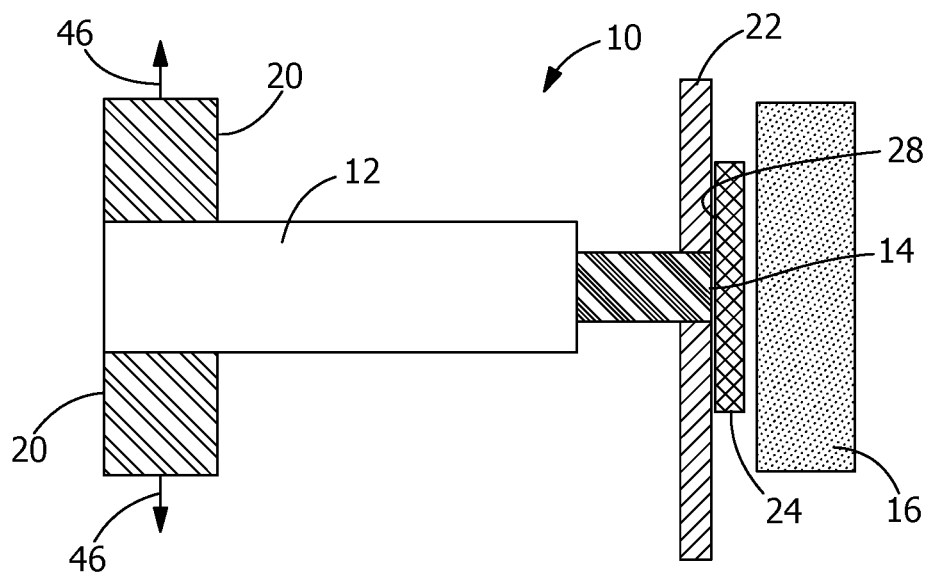
FIG. 10 is a top diagrammatic view of the stripped cable released from the cable clamp.

If the cable end 14 is detected within an acceptable range of its initial position by the sensing device 24, the sensing device 24 provides a signal that the cable 12 did not move within the cable clamps 20 during the cable preparation process, allowing the cable clamps 20 to move away from the cable 12, as shown by the arrow 46 in FIG. 10. As this occurs, the cable 12 is released to be moved from the cable end sensing apparatus 10 to the next station.

Figure 11:
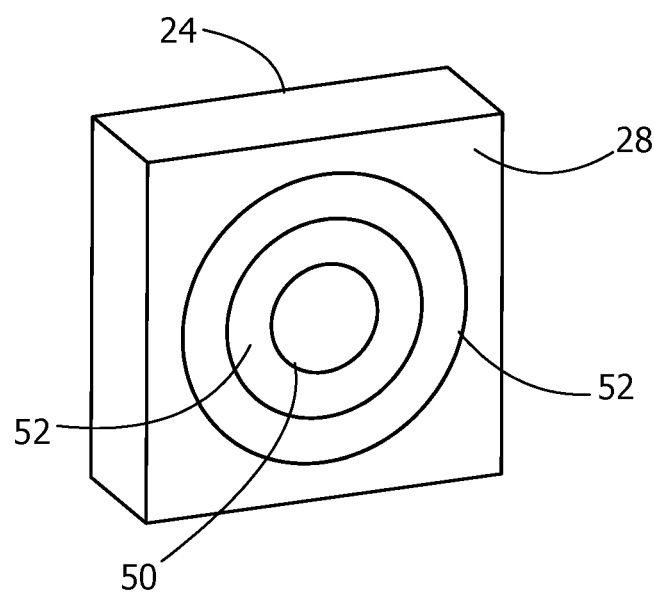
FIG. 11 is a front perspective view of an alternate illustrative embodiment of the sensing device of the cable end sensing apparatus.

As shown in FIG. 11, the sensing device 24 may include a sensing target zone 50 on the surface 28 of the sensing device 24. The sensing target zone 50 can be used to ensure the cable 12 is centered in the cable end sensing apparatus 10 before the preparation process described above begins. If the cable 12 is not centered, the sensing device 24 of the cable end sensing apparatus 10 will enter a fault state and alert the operator that there is an issue with the positioning of the cable 12.

As shown in FIG. 11, the target zone 50 of the sensing device 24 may include separate, sensing zones, such as, but not limited to, concentric sensing rings 52 to determine the diameter of the cable 12 to ensure that the proper size of cable 12 is used before the preparation process described above begins. In other embodiments, the target zone 50 is grid or an array of sensing zones. If an improper sized cable 12 is positioned in the cable end sensing apparatus 10, the sensing device 24 will enter a fault state and alert the operator that there is an issue with the size of the cable 12.

The sensed capacitive value of the cable 12 as determined by the sensing device 24 may be compared to the known capacitive value of a known or ideal cable to determine whether the cable 12 is of an appropriate length and/or diameter. If the sensing device 24 senses an improper capacitive value of the cable 12, as compared to the known or ideal cable, the sensing device 24 will enter a fault state and alert the operator that there is an issue with the cable 12.

While the embodiment described herein have sensing devices 24 which detect changes in capacitance, other types of sensing devices may be used. For example, the sensing devices may use other cable end sensing technologies, such as resistive sensing or a mechanical switch to perform the same tasks described above.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method of sensing a cable end of a cable in a cable preparation device, the method comprising:
   positioning the cable end of the cable in engagement with a sensing device;
   detecting the cable end with the sensing device;
   clamping cable with cable clamps;
   detecting with the sensing device if the cable end remains in engagement with the sensing device after the cable is clamped;
   moving the cable end toward the sensing device if the cable end is not detected by the sensing device; and
   moving the sensing device away from an axis of insertion of the cable to allow the cable to enter the cable preparation device.

2. The method as recited in claim 1, wherein if the sensing device does not detect the cable end with a certain predetermined distance after the cable is clamped, the sensing device will enter a fault state and alert an operator that there is an issue with the cable location.

3. The method as recited in claim 1, wherein the sensing device is moved perpendicular to the axis of insertion of the cable.

4. The method as recited in claim 1, comprising:
   with the sensing device moved from the axis of insertion, moving the cable clamps and cable in the direction toward the cable preparation device until the cable end of the cable is positioned in the cable preparation device;
   preparing the cable end in the cable preparation device.

5. The method as recited in claim 4, comprising:
   with the cable end properly prepared by the cable preparation device, the cable clamps and cable are retracted until the cable end is moved past a plane of the sensing device;
   moving the sensing device perpendicular to the axis of insertion of the cable, wherein the sensing device is moved to be in line with the axis, thereby preventing the cable end of the cable from entering the cable preparation device.

6. The method as recited in claim 5, comprising:
   with the sensing device properly positioned, the cable clamps and cable are advanced and moved toward the sensing device;
   detecting the cable end is in engagement with the surface of the sensing device.

7. The method as recited in claim 6 wherein if the sensing device does not detect the cable end with a certain predetermined distance, the sensing device will enter a fault state and alert the operator that there is an issue with the cable preparation process.

8. The method as recited in claim 6 wherein if the cable end is detected within an acceptable range of its initial position by the sensing device, the sensing device provides a signal that the cable did not move within the cable clamps during the cable preparation process, allowing the cable clamps to move away from the cable.

9. The method as recited in claim 1 wherein the sensing device has a sensing target zone on the surface of the sensing device, the sensing target zone ensures the cable is centered in the cable end sensing apparatus.

10. The method as recited in claim 9 wherein if the cable is not centered, the sensing device will enter a fault state and alert the operator that there is an issue with the positioning of the cable.

11. The method as recited in claim 9 wherein the sensing target zone has sensing zones to determine the diameter of the cable to ensure that the proper size of cable is used.

12. The method as recited in claim 11 wherein if an improper sized cable is positioned in the cable end sensing apparatus, the sensing device will enter a fault state and alert the operator that there is an issue with the size of the cable.

13. The method as recited in claim 1 wherein the sensing device is a sensing plate which detects changes in capacitance to determine whether or not the cable is contacting the sensing device.

14. The method as recited in claim 13 wherein a sensed capacitive value of the cable as determined by the sensing device is compared to a known capacitive value to determine whether the cable is of an appropriate length and/or diameter.

15. The method as recited in claim 14 wherein if the sensing device senses an improper capacitive value of the cable, the sensing device will enter a fault state and alert the operator that there is an issue with the cable.

16. A cable end sensing apparatus for detecting an end of a cable, the cable end sensing apparatus comprising:
   cable clamps for clamping and moving the cable;
   a movable sensing device having a first position in which the movable sensing device is positioned in line with an axis of insertion of the cable to engage the end of the cable and to prevent the cable from moving beyond the movable sensing device;

the movable sensing device having a second position in which the movable sensing device is moved away from the axis of insertion of the cable to allow the cable to move beyond the sensing device.

17. The cable end sensing apparatus as recited in claim 16, wherein the sensing device is a sensing plate which detects changes in capacitance to determine whether or not the cable is contacting the sensing device.

18. The cable end sensing apparatus as recited in claim 16, wherein the sensing device has a sensing target zone on the surface of the sensing device, the sensing target zone ensures the cable is centered in the cable end sensing apparatus.

19. The cable end sensing apparatus as recited in claim 18, wherein the sensing target zone has sensing zones to determine the diameter of the cable to ensure that the proper size of cable is used.

20. The cable end sensing apparatus as recited in claim 16, wherein the sensing device is moved perpendicular to the axis of insertion of the cable.

\* \* \* \* \*